(12) United States Patent
Agrawala et al.

(10) Patent No.: US 7,406,116 B2
(45) Date of Patent: Jul. 29, 2008

(54) METHOD AND SYSTEM FOR DETERMINING USER LOCATION IN A WIRELESS COMMUNICATION NETWORK

(75) Inventors: Ashok K Agrawala, Ashton, MD (US); Moustafa Youssef, Hyattsville, MD (US)

(73) Assignee: University of Maryland, College Park, MD (US)

( * ) Notice: Subject to any disclaimer, the term of this patent is extended or adjusted under 35 U.S.C. 154(b) by 731 days.

(21) Appl. No.: 10/529,372

(22) PCT Filed: Mar. 26, 2004

(86) PCT No.: PCT/US2004/007710

§ 371 (c)(1),
(2), (4) Date: Mar. 28, 2005

(87) PCT Pub. No.: WO2004/095790

PCT Pub. Date: Nov. 4, 2004

(65) Prior Publication Data

US 2005/0243936 A1    Nov. 3, 2005

(51) Int. Cl.
*H04B 17/02* (2006.01)
*H04B 7/185* (2006.01)

(52) U.S. Cl. .................................. 375/213; 342/357.01

(58) Field of Classification Search ................. 375/213, 375/224; 342/357.01, 357.08, 357.17, 386, 342/450; 455/456.3
See application file for complete search history.

(56) References Cited

U.S. PATENT DOCUMENTS

2004/0078598 A1* 4/2004 Barber et al. ............... 713/201
2005/0073979 A1* 4/2005 Barber et al. ............... 370/338
2007/0067434 A1* 3/2007 Bahl .......................... 709/223

* cited by examiner

*Primary Examiner*—Don N Vo
(74) *Attorney, Agent, or Firm*—Rosenberg, Klein & Lee

(57) ABSTRACT

In a wireless communication network, the location of an addressable receiver relative to the locations of a plurality of addressable sources of electromagnetic radiation is found using probabilistic models of the signal strength measured at the addressable receiver. The inventive method provides location determination on a finer spatial scale than was heretofore available. A region of interest is calibrated via a discrete-space radio map storing probability distributions of received signal strength at the measurement locations. The stored probability distributions are compensated for temporal variability and biases, such as through temporal correlations of the sampled received signal strength. A measurement of the signal strength at the addressable receiver from each of the plurality of addressable sources is used in conjunction with the discrete-space radio map to identify one of the coordinates thereof that maximizes the conditional probability $P(x|s)$, where x is the radio map location and s is a vector of measured signal strengths.

39 Claims, 9 Drawing Sheets

METHOD AND SYSTEM FOR DETERMINING USER LOCATION IN A WIRELESS COMMUNICATION NETWORK

BACKGROUND OF THE INVENTION

1. Field of the Invention

The invention described herein is related to user location determination via the reception of electromagnetic signals. More specifically, the invention is related to determining the location of an addressable receiver in a wireless communication network, such as an IEEE 802.11 compliant wireless local area network.

2. Description of the Prior Art

Recent trends in wireless communication, computer networking, and information dispersal have given rise to the field of ubiquitous or pervasive computing. Ubiquitous computing allows the use of a plurality of computing devices positioned throughout a physical environment, but the access to a particular computer is essentially invisible to the user. Ideally, a person would continually interact with hundreds of nearby wirelessly interconnected computers. A user would be able to access the computer network, or rather the computer network could access the user, via a small computing device somewhere on the user's person. It has been envisioned that such a computing device may be incorporated into everyday items, even pieces of clothing.

As ubiquitous computing gains popularity, the need for context-aware applications is steadily increasing. One of the most important pieces of contextual information is the location of the user, with which the network can provide location-specific information and services.

Many systems over the years have tackled the problem of determining and tracking user position. One of the most popular, the global positioning satellite (GPS) system, is very useful in outdoor situations. However, the line-of-sight to GPS satellites is unavailable inside buildings and hence the GPS system cannot be used indoors.

Locating users in a wide-area cellular-based network has been motivated in recent years by the Federal Communication Commissions 94-102 Order, mandating the automatic location of 911 callers on a cellular phone. The two most widely known location technologies used in the wide-area cellular-based systems are time difference of arrival (TDOA) and angle of arrival (AOA). TDOA systems make use of the principle that an emitter location can be estimated by the intersection of hyperbolae of constant differential times-of-arrival of the signals at two or more pairs of base stations. AOA systems use simple triangulation based on an estimated angle of arrival of a signal at two or more base stations so as to estimate the location of a desired transmitter. While these systems are promising in outdoor environments, their effectiveness in indoor environments is limited by the multiple reflections suffered by the electromagnetic radiation, which leads to an inaccurate estimate of the time of arrival or angle of arrival.

Many infrared (IR) based systems have been proposed and are presently in use. In the Active Badge Location System, a badge worn by a person emits a unique IR signal which it relays to fixed IR receivers. The received signal is processed by a location manager software package to determine the location of the badge. However, if the walls of a room block the IR signal, the user cannot be accurately located within the blocked area. IR based location techniques also suffer from limited range, poor performance in the presence of direct sunlight, and significant installation and maintenance costs.

Magnetic tracking has been used to support virtual reality and motion capture for computer animation. These tracking systems generate axial DC magnetic field pulses from a transmitting antenna in a fixed location. The system computes the position and orientation of the receiving antennas by measuring the response in three axes orthogonal to the transmitter pulse. Such systems suffer from steep implementation costs and the requirement of tethering the tracked object to a control unit. Moreover, the sensors must remain within 1-3 meters of the transmitter and positional accuracy degrades with the presence of metallic objects in the environment.

Several RF-based location determination techniques have become the subject of recent research. The Active Bat system is based on combining RF and ultrasonic technologies. A short pulse of ultrasonic energy is emitted from a transmitter (the Bat) attached to the object to be located in response to an RF request from a local controller. The local controller sends, at the same time as the request packet, a synchronized reset signal to ceiling sensors using a wired serial network. The system measures the times-of-flight of the ultrasonic pulse to the mounted receivers on the ceiling, using the speed of sound in air to calculate the distances from the Bat to each receiver. The local controller forwards these distances to a central controller that performs the location determination computation. The lack of scalability, difficulty in deployment, and high equipment costs are disadvantages to this approach.

The Cricket location support system also uses a combination of RF and ultrasound technologies to provide a location-support service to users and applications. Wall- and ceiling-mounted beacons are spread throughout a building, and information is transmitted on an RF signal operating at 418 MHz. With each RF transmission, an ultrasonic pulse is transmitted concurrently therewith. Listening devices await the RF signal and, upon receipt of the first few bits, listen for the corresponding ultrasonic pulse. When the ultrasonic pulse arrives, the listeners run maximum-likelihood estimators to correlate RF and ultrasound samples to obtain a distance estimate. Once again, the requirement of specialized hardware and poor scalability of this system prevent the widespread use of this application.

In the last few years, many techniques have been proposed to provide user location services in an RF-based system that does not require additional hardware. The RADAR system uses an RF signal strength as an indication of the distance between the transmitter and receiver. During an offline phase, the system builds a radio map for the RF signal strength from a fixed number of receivers. During normal operation, the RF signal strength of the transmitter is measured by a set of fixed receivers and is sent to a central controller. The central controller uses a K-nearest approach to determine the location from the radio map that best fits the collected signal strength information.

The TMI system is based on triangulation, mapping, and interpolation (TMI). In the TMI technique, the physical position of all the access points in the area must be known and a function to map signal strength into distances is required. The system generates a set of training points at each trained position. The interpolation of the training data allows the algorithm to use less training data. During user location determination, the system uses the approximate function derived from the training data to generate contours and the calculated intersections between different contours yields the signal space position of the user. The nearest set of mappings from the signal space to the physical space is found by applying a weighted average, based on proximity, to the signal position.

The Nibble location system from UCLA uses a Bayesian network to infer a user location. The Bayesian network model includes nodes for location, noise, and access points (sensors). The signal-to-noise ratio (SNR) observed from an access point at a given location is taken as an indication of that location. The system also quantizes the SNR into four levels: high, medium, low, and none. However, the Nibble location system stores the joint distribution between all of the random variables of this system, which increases the amount of computation necessary and degrades system scalability.

It is apparent from the foregoing discussions of the prior art that there exists a need for a user location determination method that can be implemented without the need for additional hardware and utilizes techniques to improve spatial resolution, while at the same time, reducing the computational cost. Reducing the number of computations ultimately reduces the amount of energy required to determine a location. This is of interest in that many of the components of a ubiquitous computing system are battery-powered.

SUMMARY OF THE INVENTION

To overcome the shortcomings of the prior art and to provide user location determination with greater accuracy, the present invention provides a method for locating a computing device adapted to a wireless communication network relative to locations of a plurality of access points within the network. The method of the present invention is carried out by first establishing a plurality of discrete-space radio maps having coordinates corresponding to locations in space at which a calibration signal strength is measured. The coordinates of each of the discrete-space radio maps have a probability distribution of calibration signal strength from a corresponding one of the access points stored thereat. Once the discrete-space radio maps have been established, the received signal strength between each access point and the computing device is measured. The received signal strength measurement is compensated for temporal variations and biases of the signal strength measurement. The location of the computing device is identified by one of the coordinates of the discrete-space radio maps which maximizes the probability that the identified coordinate corresponds to a location in space at which the compensated signal strength measurement would be measured. The discrete-space radio maps may be interpolated to provide a more accurate determination of the user location. Clustering of addressable sources is used to reduce the number of computations required to determine the location of the user.

DETAILED DESCRIPTION OF THE PREFERRED EMBODIMENTS

Figure 1:
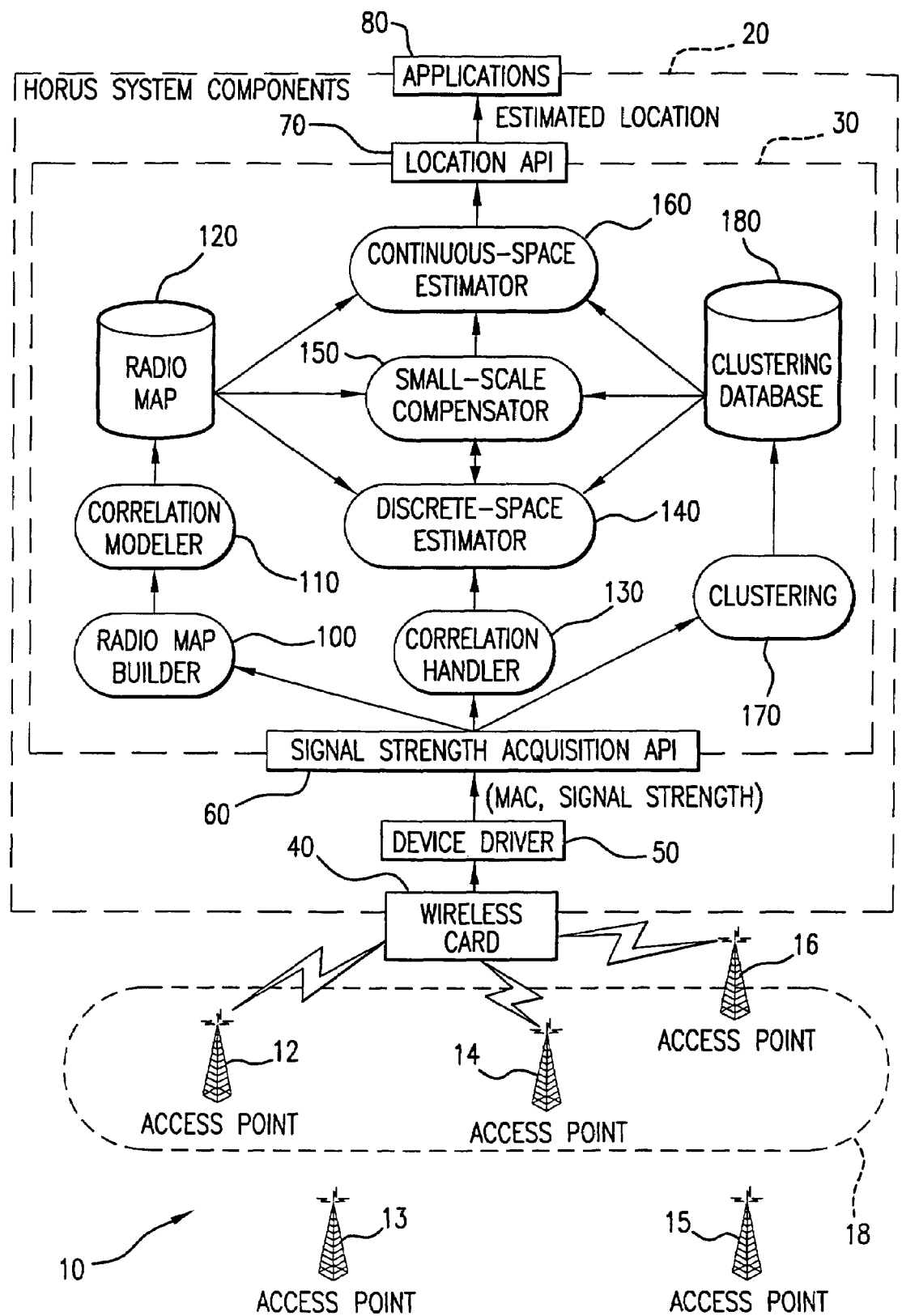
FIG. 1 is a block diagram of the system components of the present invention as utilized in a wireless local area network.

Referring to FIG. 1, system components of the present invention, designated "Horus" by the inventors thereof, are shown as implemented in a wireless communication network specified by the IEEE Standard 802.11. The 802.11 wireless network has all of the elements to implement the invention and is used herein to exemplify the invention without limiting the scope thereof. A wireless local area network (WLAN) implemented in accordance with IEEE 802.11 Standard, generally indicated at 10, consists of a plurality of access points 12-16 and a computing device 20. Although WLAN 10 is shown in FIG. 1 with only five access points and one computing device, a typical implementation includes many more of both access points and computing devices. Briefly stated, the present invention acquires an indication of the signal strength of a set of access points 18 and, via a previously constructed radio map, as will be fully described below, locates the receiving computing device 20 as being at a location x=(x, y, z) at which the conditional probability $P(x|s)$, where s is a vector containing the received signal strength indications.

As will be described in paragraphs that follow, a radio map is formed from measurements of received signal strength at discrete locations in space and is stored in radio map database 120. In similar systems of the prior art, the locations of the radio map coordinates define the finest possible resolution of the location determination method. Moreover, wireless network interface cards (NIC) provide received signal strength indications (RSSI) as integer values. This further places a limit on the spatial resolution in that the received signal strength is not a continuous function of space, but one containing a larger number of discontinuities. The present invention, using probabilistic techniques, overcomes the discrete nature of the radio map to provide a level of accuracy in location determination heretofore unavailable through similar systems of the prior art.

Prior to discussing the Horus system components and the associated method of the present invention, the mathematical model forming the basis of the present invention will be developed. We begin by letting X be a two- or three-dimensional physical space which is covered by k access points. At each location xeX, we can acquire the signal strength from k access points. We denote the k-dimensional signal strength space as S. Each element in this space is a k-dimensional vector whose components represent the measured signal strength from a corresponding access point. As previously mentioned, the signal strength returned from wireless NICs are typically integer values, thus the signal strength space S is a discrete space. Sampling from the signal strength space S at location x at time t, denoted by s(x,t), can be viewed as a vector stochastic process. We can assume that this process is stationary, therefore, the time index can be dropped. We further assume that the samples from different access points are independent. As previously noted, the problem then becomes, given a signal strength vector $s=(s_1, \ldots s_k)$, we wish to find the location xeX that maximizes $P(x|s)$.

The location determination algorithm of the present invention is typically carried out in two phases: an offline calibration or training phase and an on-line location determination phase. For the immediate discussion, we will assume a discrete X space. In later paragraphs, a continuous-space model will be described which, as previously mentioned, overcomes the limited spatial resolution of the discrete X space assumption.

Prior to attempting to determine a location via the method of the present invention, the receiving device 20 is taken offline (in terms of the subject method, but not necessarily removed from the WLAN for the purposes of executing other applications) for the calibration phase. At each location x in the set of radio map locations X, a model for the joint probability distribution of the access points at the location x is stored. In one embodiment of the present invention, the Horus system estimates the joint probability distribution as the product of the marginal probability distributions of the individual access points (access points running on different channels are independent) as:

$$P(s|x) = P(AP_1 = s_1|x) \ldots P(AP_k = s_k|x) \quad (1)$$

Figure 2:
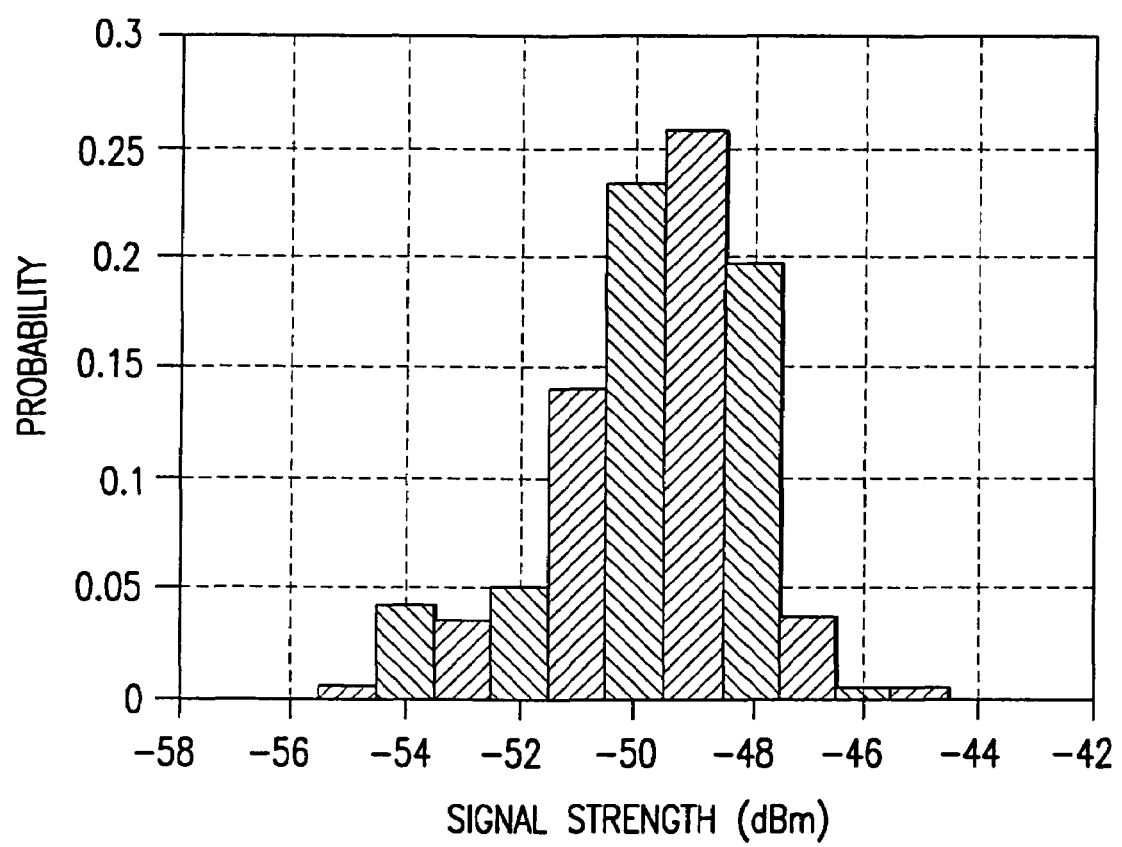
FIG. 2 is a histogram illustrating the temporal variability of received signal strengths of an access point.

For a given location, $P(AP_i = s_i)$ can be estimated using the normalized histogram of the received signal strength of the access point $AP_i$ at the given location. Such a histogram is shown in FIG. 2. The histogram illustrates that the measured signal strength at a fixed position varies over time and the variations can be as large as 10 dBm. This time variation of the access point channel can be attributed to changes in the physical environment such as by personnel movement. Thus, depending on a single sample for estimating the user location may lead to inaccurate results if, for example, the sample is located at a tail of the distribution.

Once the radio map has been established, the system can be used in its normal operating mode, i.e., in on-line location determination. As previously discussed, it is desired to find the location $x \in X$, given a signal strength vector $s = (s_1, \ldots s_k)$, that maximizes the probability $P(x|s)$. That is to say, it is an object of the invention to find, $$\mathrm{argmax}_x[P(x|s)] \quad (2)$$

Using Baye's theorem, this can be rewritten as:

$$\mathrm{argmax}_x[P(x|s)] = \mathrm{argmax}_x\left[\frac{P(s/x) \cdot P(x)}{P(s)}\right] \quad (3)$$

Since P(s) is constant for all x, we can rewrite equation 3 as:

$$\mathrm{argmax}_x[P(x|s)] = \mathrm{argmax}_x[P(s|x)P(x)] \quad (4)$$

P(x) can be determined from a user profile (as discussed below) based on the fact that if the user is at a given location, it is more probable that he will be at an adjacent location in the future. If the user profile information is not known, or not used, then we can assume that all the locations are equally likely and the term P(x) can be factored out from the maximization process. Equation 4 becomes:

$$\mathrm{argmax}_x[P(x|s)] = \mathrm{argmax}_x[P(s|x)] \quad (5)$$

The remaining term is then calculated by using:

$$P(s|x) = \prod_{i=1}^{k} P(s_i|x) \quad (6)$$

$P(s_i|x)$ is estimated from the signal strength distributions stored in the radio map.

The implications of Eq. (6) are conceptually illustrated in FIG. 3. As shown in the Figure, radio map 125 is constructed from a plurality of sub-radio maps, or radio map planes 125a-125k. Each radio map 125a-125k is established during the offline training phase, each corresponding to the measured signal strengths from a respective access point. On each radio map 125a-125k, the probability distribution of signal strength from a corresponding access point is stored at each location x.

Figure 3:
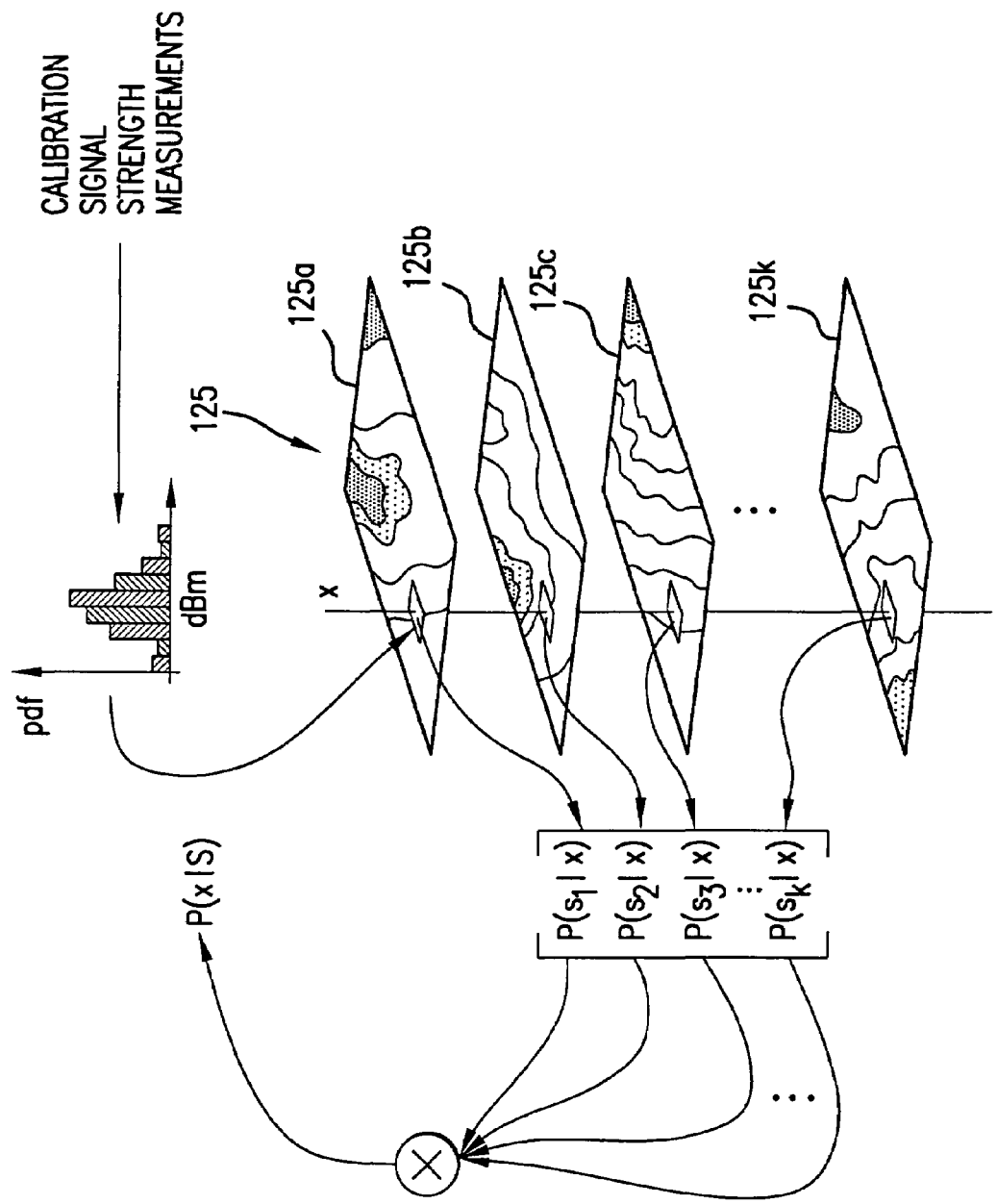
FIG. 3 is an illustration conceptualizing the location determination algorithm of the present invention.

As shown in FIG. 3, having determined $s=(s_1,\ldots,s_k)$ at the receiving device 20, a location x is identified at which the product of the marginal joint probabilities $P(s_i|x)$ is maximum.

As previously stated, a probability distribution of signal strengths is stored at each coordinate of the radio map corresponding to a respective access point. The probability distribution, in one embodiment of the present invention may be a histogram. However, the signal strength histograms may not be smooth. Since the sampling process used to estimate the signal strength distributions is limited in time, the resulting histograms may be missing some values. This may cause some error in the location determination phase if sample values are missing from a signal strength measurement. The Horus system solves this problem by approximating the discrete random variable of the histogram by a continuous random variable, e.g., a Gaussian random variable. The PDF of the Gaussian distribution is given by:

$$pdf(s) = \frac{1}{\sigma\sqrt{2\pi}} e^{-(s-\mu)/2\sigma^2} \quad (7)$$

where μ and σ are the mean and standard deviation of the distribution respectively. To obtain the probability P(s|x) using the Gaussian PDF, we use:

$$P(s|x) = \int_{s-0.5}^{s+0.5} pdf(y)\,dy \quad (8)$$

The RSSI returned from the wireless NIC is quantized to integer values and the above integration can be obtained by numerical integration. Although the integration involves complex calculations (exponentiation and square root), lookup tables for the standard normal distribution may be used to obviate the calculations.

Returning now to FIG. 1, the components of the system through which the method of the present invention may be executed will now be described. Signals from a set 18 of access points are received at the receiving device 20 via a wireless network interface card 40. Wireless card 40 is in communication with device driver 50 which serves as the interface between the physical network layer and the data link layer of the WLAN protocol. Device driver 50, in turn, communicates medium access control (MAC) signals and the measured signal strength to the signal strength acquisition application programming interface (API) 60. The signal strength acquisition API 60 serves as the interface to the Horus system 30 where, as will be discussed below, the measured signal strengths from the set of access points 18 are processed and used to determine the most probable location of the receiving device 20. The most probable location is communicated to applications 80 from the Horus system 30 through the location APT 70.

Indications of the measured signal strength are supplied from the signal strength acquisition API 60 to radio map builder 100, correlation handler 130, and clustering module 170. Radio map builder 100 is responsible for building the discrete-space radio map and storing it for use during the location determination phase. Correlation modeler 110, which operates in conjunction with radio map builder 100, is used to collect statistics of the received signal strength during the offline training phase so as to compensate the measured signal for temporal correlation. The radio map is stored in a radio map database 120.

Clustering module 170 is used to group radio map locations according to the access points accessible at the respective location. Clustering is used by the present invention to reduce the computational requirements of the system and, hence, conserve power. The clusters of access points are stored in clustering database 180. Exemplary methods for clustering will be discussed in paragraphs that follow.

During the on-line location determination phase, indications of signal strength are transferred from the signal strength acquisition API 60 to correlation handler 130. Correlation handler 130, in cooperation with correlation modeler 110, is responsible for reducing temporal signal correlation. Correlation reduction is an advantageous feature of the present invention and will be discussed in detail in paragraphs that follow.

The correlation reduced signal strength measurement from each access point 12, 14, 16 from set 18 is communicated to discrete-space estimator 140, which estimates the user location based on the discrete-space radio map as outlined above. The output of discrete-space estimator 140 is a radio map location which maximizes P(x|s). The location x is conveyed to small-scale compensator 150 which handles the small-scale variation characteristics of the wireless channels of access points 12, 14, 16. As will be shown in paragraphs that follow, the small-scale compensator 150 runs a perturbation technique on the location x to improve the location estimate. Small-scale compensator may require interaction with discrete-space estimator 140 to verify and/or improve in the determination of radio map location x.

The small-scale compensated location is communicated to continuous-space estimator 160 which refines the estimate of the location by calculating a continuous-space location estimate. The continuous-space estimate is achieved via an interpolation function of the probability distributions held in the coordinates of discrete-space radio map. The details of the continuous-space location estimate approach are discussed in later paragraphs.

The continuous-space estimate of the location of receiving device 20 is supplied to the location API 70 where it can be retrieved by applications 80. Applications 80 may include executable programs or other context aware systems that require the location of the receiving device 20.

Whereas the components of the Horus system 30 are shown in FIG. 1 as being contained within the receiving device 20, other possible configurations are within the scope of the present invention. For example, one or both of radio map database 120 and clustering database 180, and some or all of the modules associated therewith (i.e., correlation modeler 110, radio map builder 100 associated with radio map database 120 and clustering module 170 associated with clustering database 180), may be located on a server accessible to users of WLAN 10. The use of servers in a communication network to provide data and services to computing devices having access thereto is well known and the specific implementations thereof do not form a part of the present invention.

As implemented by an IEEE 802.11 WLAN, access points 12-16 comprise an addressable source of electromagnetic radiation and receiving device 20, via wireless NIC 40, realizes an addressable receiver of the electromagnetic radiation. To make a measurement of signal strength from a particular access point, addressable receiver 20 forms a probe packet containing its address and the address of the access point from which the measurement is to be made. The access point receives the packet, responds with its address and the address of the addressable receiver 20. The measurement RSSI (received signal strength indication) is determined at the physical layer and transferred to the medium access control layer as an integer value. Thus, addressable receiver 20 can probe any of the access points within its range to determine the signal strength thereof. The probing technique is used during both the offline calibration phase and on-line location determination phase.

In similar fashion, the method of the present invention may be executed such that wireless interface card 40 acts as an addressable source and access points 12-16 embody addressable receivers. In such a configuration, the addressable source 40 would send a packet respectively addressed to each of the addressable receivers 12-16. Each addressable receiver 12-16 would make the respective signal strength measurement, process the measurements in accordance with aspects of the present invention and store the processed measurements (e.g., the probability distribution of signal strength at each addressable receiver) in a radio map of radio map database 120. The radio map database 120 could be located at a central location, such as a server as previously described, and could thus be shared by multiple computing devices operating in the region of interest.

Figure 4:
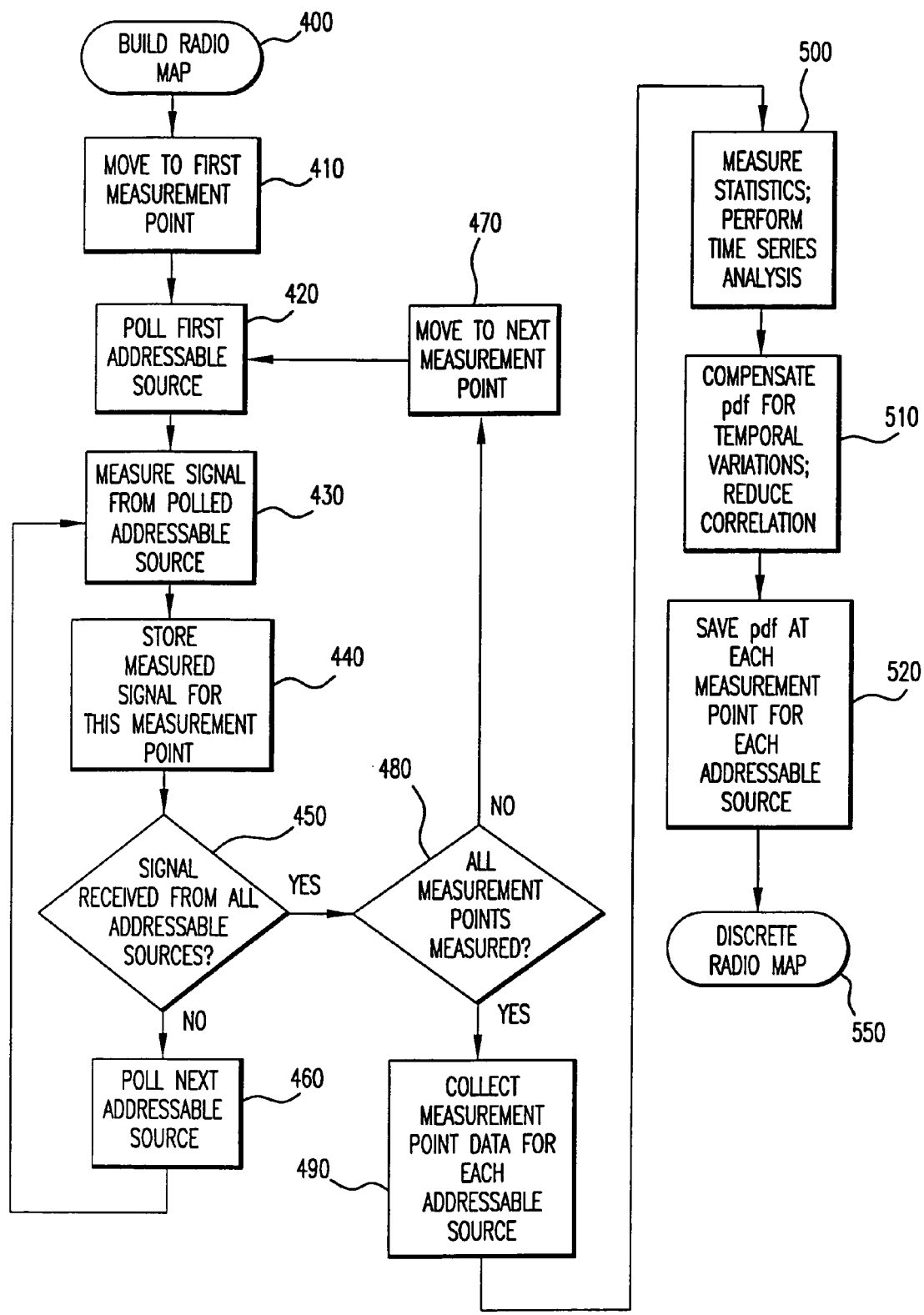
FIG. 4 is a flow chart of the primary steps in establishing a radio map according to the present invention.

Referring now to FIG. 4, there is shown a flow diagram illustrating the method steps for building radio map 125. In this exemplary embodiment, the computing device 20 acts as the addressable receiver and the access points 12-16 act as addressable sources. The radio map building process is entered at block 400 where control is transferred to block 410 in which a user moves to a first measurement point. Identifying measurement points is typically done prior to the actual measurement stage. The spacing of measurement points is less critical when implementing the present invention for location determination over similar systems of the prior art due to the probabilistic methods thereof Measurement grid spacing is also a function of the number of access points operating within the region of interest. An exemplary layout of a 20,000 square feet area covered by 12 access points might be sampled at a grid spacing of 5 feet where, on average, each measurement location is covered by 4 access points.

At the first measurement point, the addressable receiver polls the first addressable source, i.e., access point, in accordance with the previously described polling method, as shown in block 420. In block 430, the signal is measured from the polled addressable source and the measurement is stored for the current measurement point and for the current access point as shown in block 440. The process then determines whether the signal has been measured from all addressable sources as illustrated by decision block 450. If an access point remains from which a measurement has not yet been taken, control is transferred to block 460, whereby the next addressable source is polled and a signal measured therefrom. If, however, it is determined that all of the applicable address sources have been measured, the process determines if all measurement points in the measurement grid have been measured as demonstrated by decision block 480. If there are further measurement points at which signal strength measurements are to be taken, control is transferred to block 470, whereby the user moves to the next measurement point and the applicable addressable sources from that point are polled and the signal strength measured.

Once all measurement points in the measurement grid have been measured, the process continues at block 490 where the measurement point data for each addressable source is collected in preparation for radio map construction. In block 500, the statistics of the measurement point data for each addressable source are determined and a time series analysis, as will be discussed in paragraphs that follow, is performed at block 500. At block 510, the probability distribution of signal strength is compensated for temporal variations and to reduce temporal correlation by a technique described below. Blocks 500 and 510 are typically performed by correlation modeler 110. The compensated probability distribution at each measurement point for each addressable source is stored in the discrete radio map 520. The process exits at block 550.

In certain embodiments of the present invention, the discrete radio map is interpolated between measurement points to produce a continuous-space location estimate. To illustrate a continuous-space location estimation technique in accordance with the present invention, the signal strength distributions of the radio map are modeled using the Gaussian approximation described above. To find the Gaussian distribution for any arbitrary point not in the discrete-space radio map, the mean and variance of the distribution at that point is required. Empirical studies have shown that the variance of the distributions are approximately constant across different locations. Hence, only the mean value need to be interpolated. It is the objective of continuous-space estimator 160 to find the location $x \in X$, given a signal strength vector s, that maximizes $P(s|x)$, where X is a continuous two (or three) dimensional space.

For one access point, the signal strength vector s reduces to a scalar value. It is assumed that the average signal strength ($\mu$) is represented as a function of x (that is, the interpolation function is $\mu = f(x)$).

In this case, $P(s|x)$ becomes:

$$P(s|x) = CDF_x(s+0.5) - CDF_x(s-0.5) \quad (9)$$

Where $$CDF_z(s) = \frac{1}{2}\left[1 + \text{erf}\left(\frac{s - f(x)}{\sigma\sqrt{2}}\right)\right] \quad (10)$$

is the CDF for the Gaussian distribution at location x. Therefore, Equation 9 becomes:

$$P(s|x) = \frac{1}{2}\left[\text{erf}\left(\frac{s+0.5-f(x)}{\sigma\sqrt{2}}\right) - \text{erf}\left(\frac{s-0.5-f(x)}{\sigma\sqrt{2}}\right)\right] \quad (11)$$

$$= \frac{1}{\sqrt{\pi}}\left[\int_0^{\frac{s+0.5-f(x)}{\sigma\sqrt{2}}} e^{-t^2}\,dt - \int_0^{\frac{s-0.5-f(x)}{\sigma\sqrt{2}}} e^{-t^2}\,dt\right]$$

To obtain the value of x at which $P(s|x)$ is maximized, it is required to find where $$\frac{\delta P(s/x)}{\delta x} = 0.$$

Using Leibniz integral rule:

$$\frac{\delta P(s/x)}{\delta x} = \frac{1}{\sigma\sqrt{2\pi}} f'(x)\left[e^{-\left(\frac{s+0.5-f(x)}{\sigma\sqrt{2}}\right)^2} - e^{-\left(\frac{s-0.5-f(x)}{\sigma\sqrt{2}}\right)^2}\right] \quad (12)$$

Therefore, the optimal value of x occurs at:

$$e^{-\left(\frac{s+0.5-f(x)}{\sigma\sqrt{2}}\right)^2} - e^{-\left(\frac{s-0.5-f(x)}{\sigma\sqrt{2}}\right)^2} = 0 \Rightarrow e^{-\left(\frac{s+0.5-f(x)}{\sigma\sqrt{2}}\right)^2} \quad (13)$$

$$= e^{-\left(\frac{s-0.5-f(x)}{\sigma\sqrt{2}}\right)^2} \Rightarrow$$

$$= \left(\frac{s+0.5-f(x)}{\sigma\sqrt{2}}\right)^2$$

$$= \left(\frac{s-0.5-f(x)}{\sigma\sqrt{2}}\right)^2 \Rightarrow$$

$$\frac{s+0.5-f(x)}{\sigma\sqrt{2}}$$

$$= -\frac{s-0.5-f(x)}{\sigma\sqrt{2}} \Rightarrow$$

$$x = f^{-1}(s)$$

Equation 13 shows that, given a signal strength s, the optimal location x that maximizes $P(s|x)$ can be obtained by reversing the interpolation function. This result is not trivial as the optimal x depends on the distribution of the data. For example, if the signal strength distribution at each location follows an exponential distribution, then the optimal x value is:

$$x = f^{-1}\left(1 \bigg/ \ln\left(\frac{s+0.5}{s-0.5}\right)\right)$$

For the multiple access points case, the independence of access points is utilized. We convert the problem into an optimization problem. For a given signal strength vector $s = (s_1, \ldots, s_k)$, we want to find x that minimizes:

$$(f_1(x) - s_1)^2 + (f_2(x) - s_2)^2 + \ldots + (f_k(x) - s_k)^2 \quad (14)$$

where $f_i$ is the interpolation function for access point i. Note that this function value is greater than or equal to zero, and equals zero if all the interpolation functions are "perfect", meaning that the interpolation error is zero.

In order to reduce the complexity of the interpolation function, interpolation is applied between groups of adjacent coordinates of the radio maps. An exemplary embodiment of the present invention implements an interpolation function for each of three points. The discrete-space is divided into a mesh of triangles and an interpolation function is applied to each. For a given signal strength vector, one of the triangles is sought for that contains this vector with maximum probability and a point inside the triangle is supplied to the location API 70 (similar to the discrete-space case, where the continuous space is divided into triangles as opposed to individual points).

Figure 5:
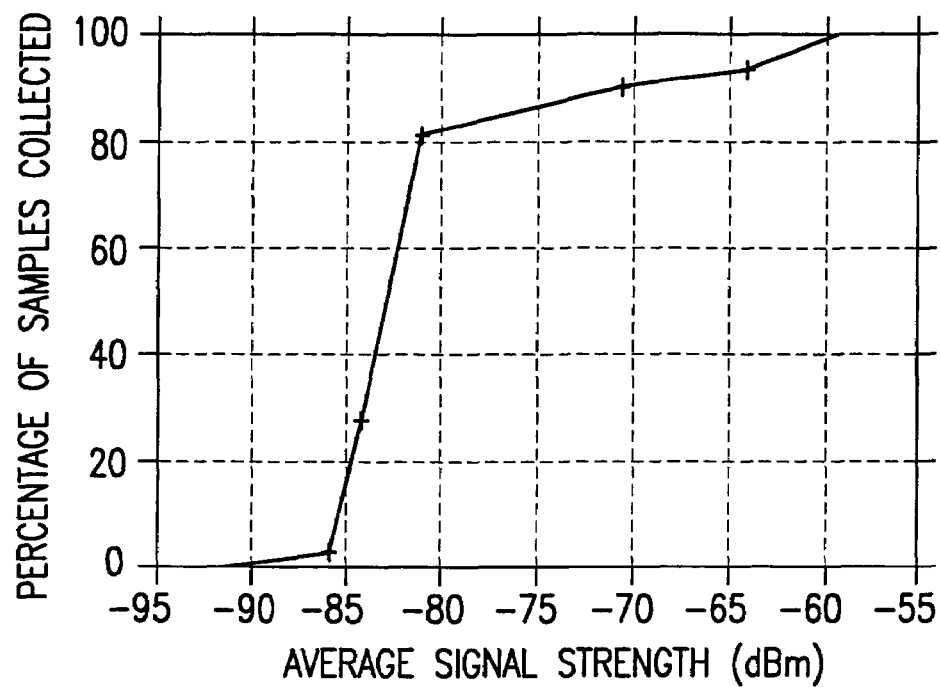
FIG. 5 is a graph of the average received signal strength received from an access point as a function of time.

An advantageous feature of the present invention is in the compensation of variations in the received signal strength due to non-ideal characteristics of the wireless channel. As was discussed with reference to FIG. 2, the signal strength measured from a single access point varies over time. In fact, the signal from a given access point may appear and disappear in different samples over time. This is shown in FIG. 5, which illustrates the relationship between the average signal strength received from an access point and the percentage of samples received during a five minute period. The Figure shows that the number of samples collected from an access point is a monotonically increasing function of the average signal strength of the access point rather than a constant value.

Figure 6:
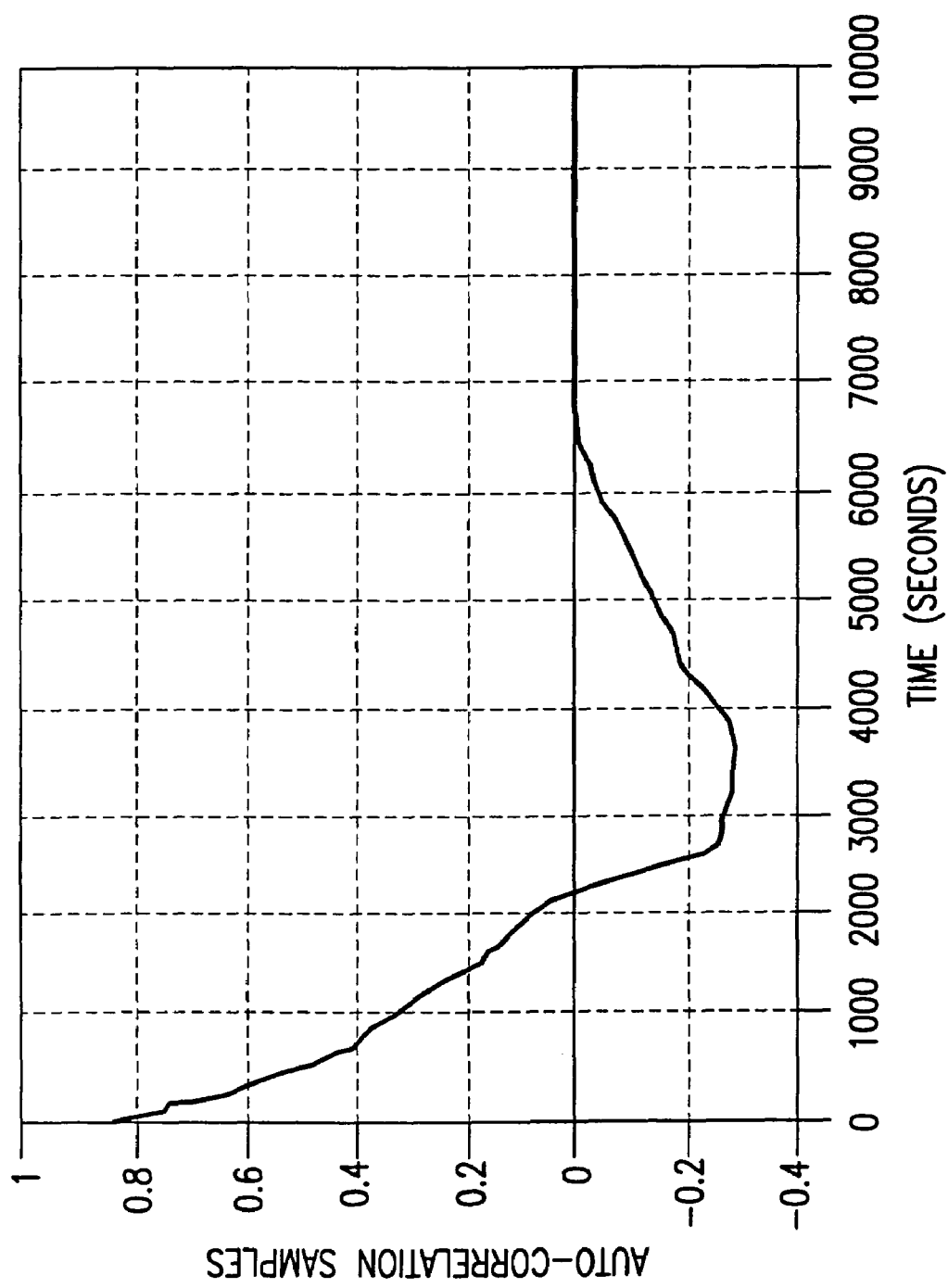
FIG. 6 is a graph depicting the autocorrelation function of samples from a single access point.

An additional source of channel noise lies in the high degree of correlation between the samples collected from an access point. FIG. 6 shows the autocorrelation function of samples collected from one access point at a rate of one sample per second at a fixed position. As is shown in the Figure, the autocorrelation of consecutive samples (lag=1) is as high as 0.9. Experience has shown that this is a typical value for IEEE 802.11 compliant access points. This high autocorrelation is expected, as over a short period of time the signal strength received from an access point at a particular location and space is relatively stable (given a static environment). This high autocorrelation value is compensated for in the method of the present invention, as will be further detailed.

Similar systems of the prior art have made an assumption that samples from a given access point over time are independent. This independence assumption leads to an increasing average distance error as the number of averaged samples increases.

Figure 7:
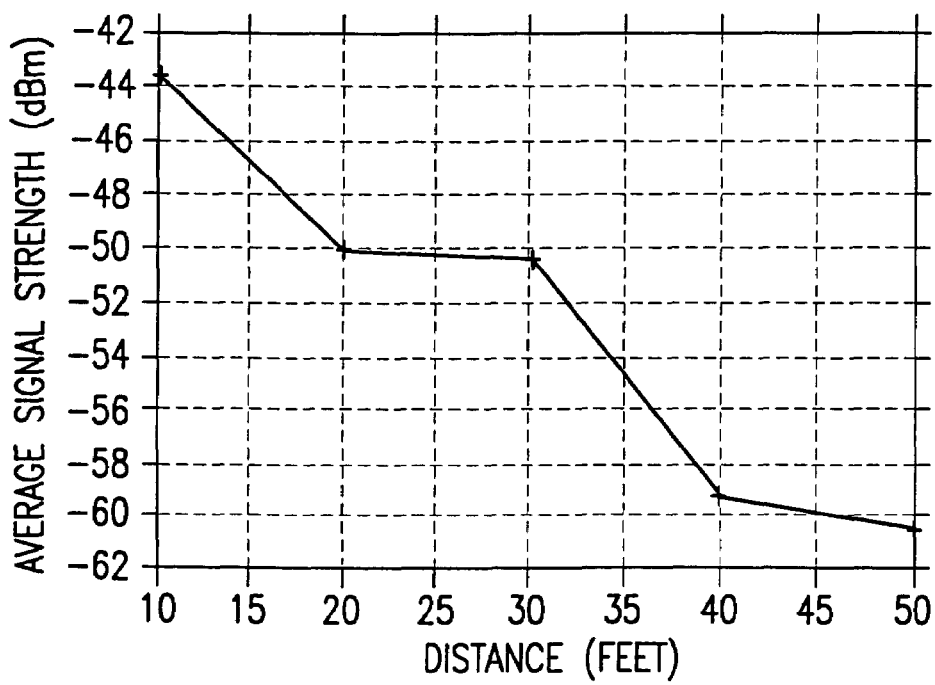
FIG. 7 is a graph depicting the attenuation of the received signal strength as a function of space.

The signal strength of any electromagnetic source is attenuated as it traverses space. These large-scale variations are desirable as they lead to a variable signature stored in the radio map for different locations and allows improved differentiation between those locations. The attenuation of the average signal strength over distance for a typical access point is shown in FIG. 7.

Small-scale variations contribute to most of the estimation errors in systems of the prior art. These variations occur when a user moves over a small distance (on the order of a wavelength). For the IEEE 802.11b WLAN working at 2.4 GHz, the wavelength is 12.5 cm. On this scale, a variation in the average signal strength up to 10 dBm can be measured in a distance as small as 3 inches. Small-scale compensator 150 advantageously corrects the measured signal strength for these variations via a perturbation technique described below.

The handling of the previously discussed temporal correlation between samples is achieved through an autoregressive model of the measured signal strength. From this model, the distribution of the average of n correlated samples can be calculated and utilized to improve the determination of the most probable user location.

Let s(t) be the stationary time series representing the samples from an access point where t is the discrete time index. The series s(t) can be represented as a first order autoregressive model as:

$$s(t)=\alpha s(t-1)+(1-\alpha)v(t); 0 \leq \alpha \leq 1 \quad (15)$$

where v(t) is a noise process, independent from s(t), and $\alpha$ is a parameter that determines the degree of autocorrelation of the original samples. Moreover, different samples from v(t) are independent, identically distributed variables (i.i.d.).

The model in Equation 15 states that the current signal strength value s(t) is a linear aggregate of the previous signal strength value (s(t)−1) and an independent noise value v(t). The parameter a gives flexibility to the model as it can be used to determine the degree of autocorrelation of the original process. For example, if a is zero, the samples of the process s(t) are i.i.d.'s, whereas if $\alpha$ is one the original samples are identical (autocorrelation=1).

As shown in Equation 15, E[s(t)]=E[v(t)]. The two processes have the same mean. The relation between the variance of the original and noise processes can be obtained as follows:

$$\text{Var}[s(t)] = \text{Var}[\alpha s(t-1) + (1-\alpha)v(t)] \quad (16)$$
$$= \alpha^2 \text{Var}[s(t-1)] + (1-\alpha)^2 \cdot \text{Var}[v(t)]$$
$$(s(t) \text{ and } v(t) \text{ independent})$$

Since the samples of s(t) are identically distributed (stationary process), Var[s(t)]=Var[s(t−1)]=Var[s]. Therefore, Equation 16 can be rewritten as:

$$(1-\alpha^2)\text{Var}[s]=(1-\alpha)^2 \cdot \text{Var}[v(t)] \quad (17)$$

therefore $$\frac{\text{Var}[v(t)]}{\text{Var}[s]} = \frac{1-\alpha^2}{(1-\alpha)^2} \quad (18)$$
$$= \frac{1-\alpha^2}{(1-\alpha)^2}$$
$$= \frac{1+\alpha}{1-\alpha}$$

Figure 8A:
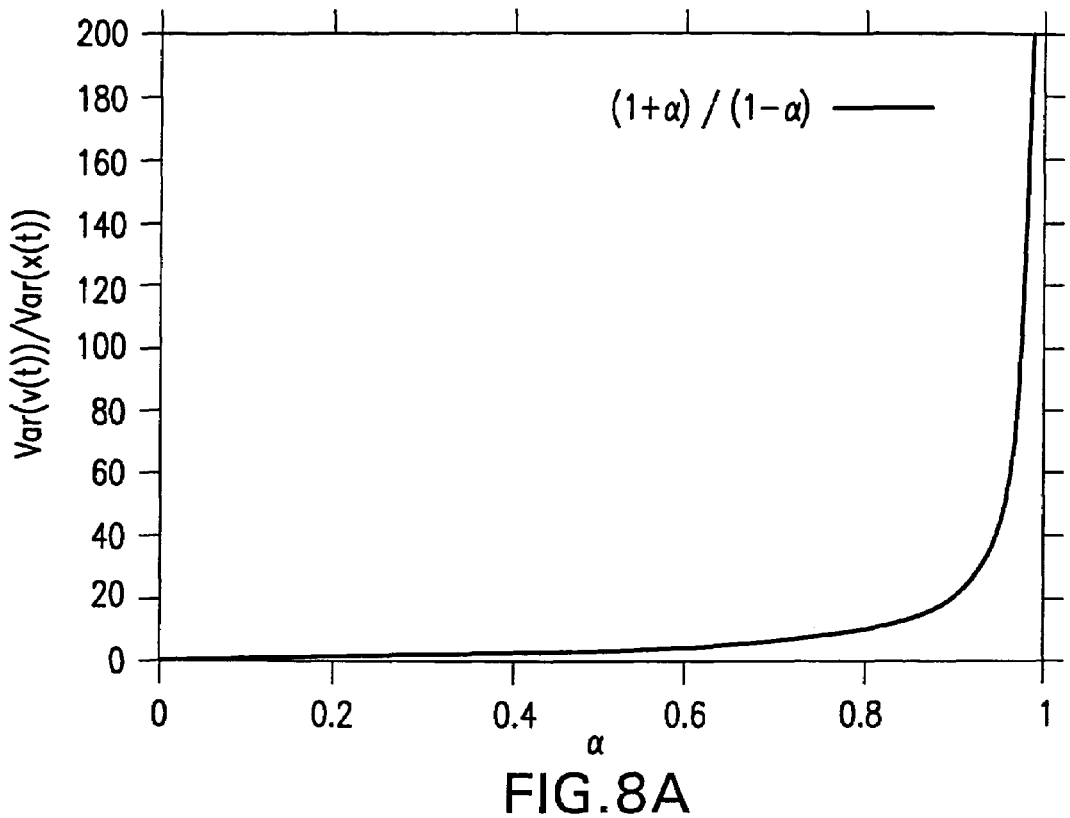
FIG. 8A is a graph of the ratio of a noise process to an original process as a function of an autoregressive model coefficient.
Figure 8B:
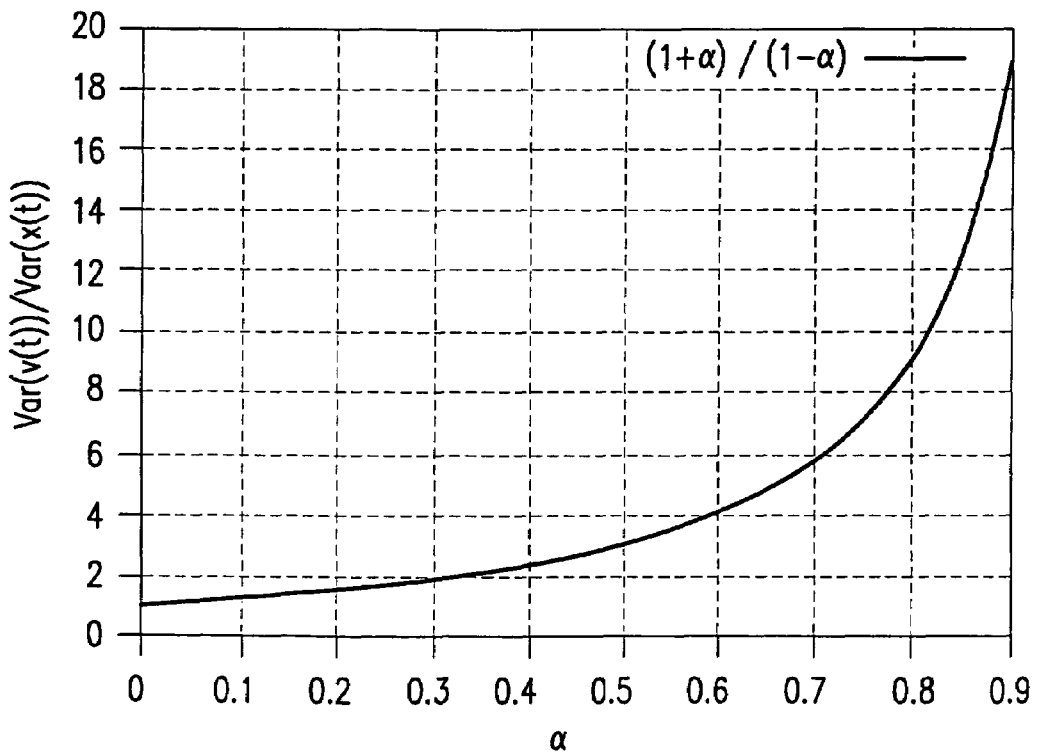
FIG. 8B is an expanded view of a portion of the graph of FIG. 8A.

It can be observed from Equation 18 that the variance of the noise process is higher than the variance of the original process. FIGS. 8A and 8B depict the ratio of Equation 18. Note that for $\alpha$=0.9, the variance of the noise process is 19 times that of the original process. This high variance is undesirable as it increases the overlap in signal strength distributions of different locations. As will be shown, the method of the present invention reduces this variance by averaging samples from a given access point over time.

From equation 15, the relationship between s(t) and s(0) can be derived:

$$s(t) = \alpha s(t-1) + (1-\alpha)v(t) \quad (19)$$
$$= \alpha^2 s(t)-2 + \alpha(1-\alpha)v(t)-1 + (1-\alpha)v(t)$$
$$= \alpha^3 s(t)-3 + \alpha^2(1-\alpha)v(t)-2 +$$
$$\alpha(1-\alpha)v(t)-1 + (1-\alpha)v(t)$$
$$= \alpha^t s(0) + (1-\alpha)\sum_{i=1}^{t} \alpha^{t-i}v(t)$$

Assuming a Gaussian distribution of signal strength, the value a can be approximated using the autocorrelation coefficient with lag one ($r_1$), which is estimated from a sample of size N as:

$$r_1 = \frac{\sum_{t=1}^{N-1}[s(t)-\bar{s}]\cdot[s(t+1)-\bar{s}]}{\sum_{t=1}^{N}[s(t)-\bar{s}]^2} \quad (20)$$

where $\bar{s}$ is the expected value of process s.

For large values of $\alpha$ (close to one), Equation 15 can be approximated as:

$$s(t) \approx \alpha s(t-1) \quad (21)$$

Substituting Equation 21 in Equation 20 yields:

$$r_1 \approx \frac{\sum_{t=1}^{N-1}[s(t)-\bar{s}]\cdot[\alpha\cdot s(t)-\bar{s}]}{\sum_{t=1}^{N}[s(t)-\bar{s}]^2}$$

$$\approx \frac{\sum_{t=1}^{N-1}[s(t)-\bar{s}]\cdot[\alpha\cdot(s(t)-\bar{s})-(1-\alpha)\cdot\bar{s}]}{\sum_{t=1}^{N}[s(t)-\bar{s}]^2}$$

$$\approx \frac{\alpha \cdot \sum_{t=1}^{N-1}[s(t)-\bar{s}]^2}{\sum_{t=1}^{N}[s(t)-\bar{s}]^2} \quad (22)$$

For large N, Equation 22 can be rewritten as:

$$r_1 \approx \alpha \quad (23)$$

Therefore for a large value of $\alpha$ and N, as is the case here, $\alpha$ can be estimated using the autocorrelation coefficient with lag one.

The mean and variance of the samples of a new process whose samples are the average of n samples from the original process can now be found. We use $A(n)$ to denote the random variable whose value is the average of n samples (from $t=0$ to $t=n-1$) of the original process $s(t)$, $n>1$. Since $$A(n) = \frac{1}{n} \cdot \sum_{j=0}^{n-1} s_j \quad (24)$$

it is apparent that $E[A(n)]=E[s(t)]$. The mean of the distribution of the average of n samples is the same as the mean of the distribution of each sample.

From equation 19, $A(n)$ can be written as:

$$A(n) = \frac{1}{n} \cdot \sum_{j=0}^{n-1}\left\{\alpha^j \cdot s(0) + (1-\alpha) \cdot \sum_{i=1}^{j} \alpha^{j-i} \cdot v_i\right\} \quad (25)$$

$$= \frac{1}{n} \cdot \left\{\frac{1-\alpha^n}{1-\alpha} \cdot s(0) + (1-\alpha) \cdot \sum_{j=1}^{n-1}\sum_{i=1}^{j}\alpha^{j-1}\cdot v_i\right\}$$

Therefore, $$\text{Var}[A(n)] = \quad (26)$$

$$\frac{1}{n^2}\cdot\left\{\left(\frac{1-\alpha^n}{1-\alpha}\right)^2\cdot\text{Var}[s(0)] + (1-\alpha)^2\cdot\sum_{j=1}^{n-1}\sum_{i=1}^{j}\alpha^{2(j-1)}\text{Var}[v_i]\right\}.$$

From Equation 18, $$\text{Var}[A(n)] = \frac{\text{Var}[s(0)]}{n^2}\cdot\left\{\left(\frac{1-\alpha^n}{1-\alpha}\right)^2 + (1-\alpha^2)\cdot \sum_{j=1}^{n-1}\sum_{i=1}^{j}\alpha^{2\cdot j-1}\right\} \quad (27)$$

$$= \frac{\text{Var}[s(0)]}{n^2}\cdot\left\{\left(\frac{1-\alpha^n}{1-\alpha}\right)^2 + (1-\alpha^2)\cdot \sum_{j=1}^{n-1}\frac{1-\alpha^{2\cdot j}}{1-\alpha^2}\right\}$$

$$= \frac{\text{Var}[s(0)]}{n^2}\cdot\left\{\left(\frac{1-\alpha^n}{1-\alpha}\right)^2 + n - 1 - \alpha^2 \cdot \frac{1-\alpha^{2(n-1)}}{1-\alpha^2}\right\}$$

Since s(t) is a stationary process, $\text{Var}[s(0)]=\text{Var}[s]$ and the final relation between $\text{Var}[A(n)]$ and $\text{Var}[s]$ is:

$$\text{Var}[A(n)] = \frac{\text{Var}[s]}{n^2}\cdot\left\{\left(\frac{1-\alpha^n}{1-\alpha}\right)^2 + n - 1 - \alpha^2 \cdot \frac{1-\alpha^{2(n-1)}}{1-\alpha^2}\right\} \quad (28)$$

Note that when $\alpha=0$ (i.e. the samples of $s(t)$ are independent), Equation 28 reduces to:

$$\text{Var}[A(n)] = \frac{\text{Var}[s]}{n} \quad (29)$$

Figure 9:
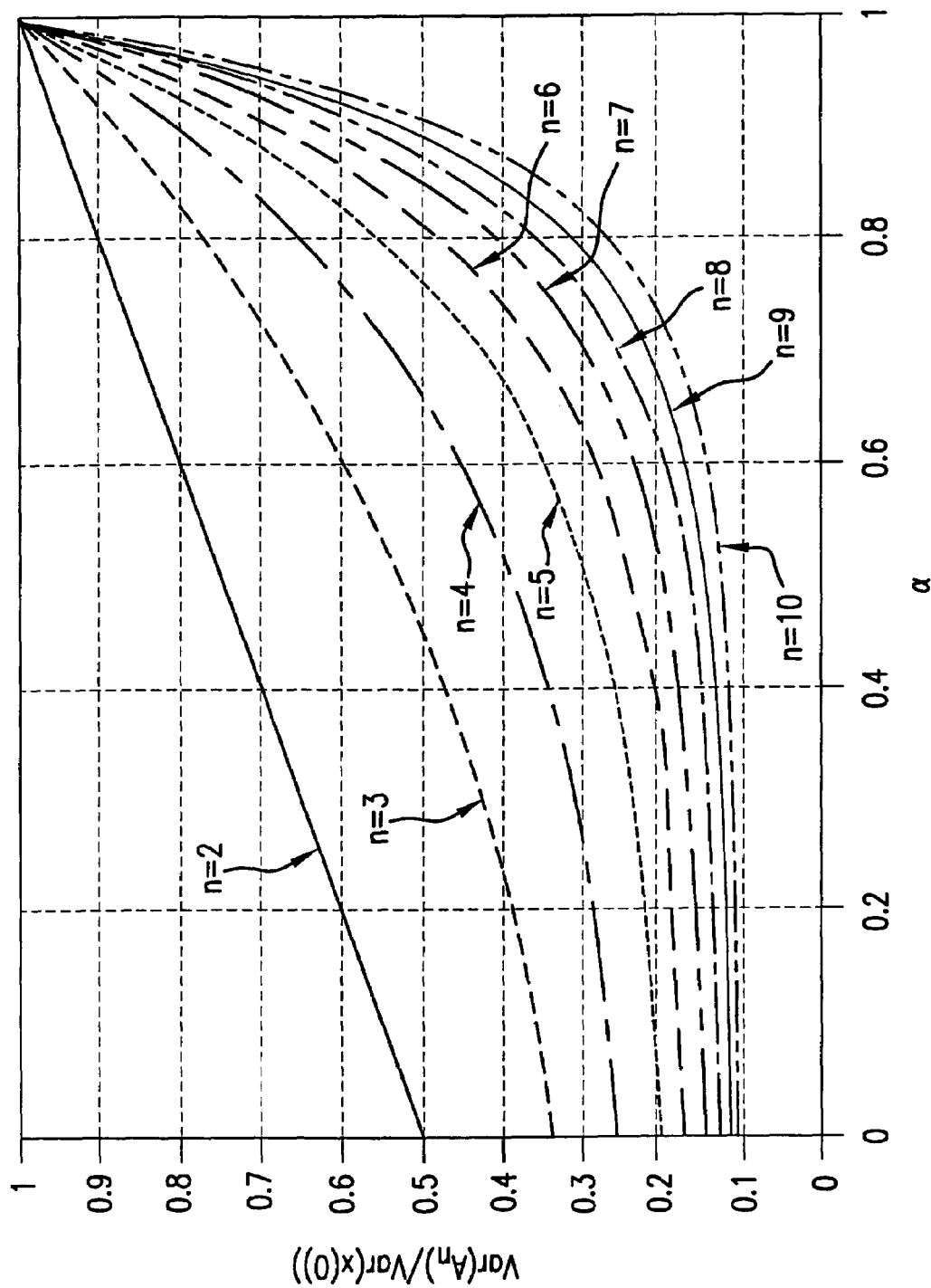
FIG. 9 is a graph of the ratio of the variance of a time-averaged received signal strength to the variance of the original process as a function of the autoregressive coefficient for different averaging numbers.

FIG. 9 shows the ratio between the variance of the averaging process and original process for different values of $\alpha$ and n. The variance of the averaging process, $\text{Var}[A(n)]$, is always less than or equal to the variance of the original process, $\text{Var}[s]$, being equal in case a equals one. Intuitively, the lower the variance of the signal strength distribution at each location, the better the ability to discriminate between different locations and the better the accuracy.

Correlation modeler 110 utilizes the results of the preceding analysis to obtain the distribution of the average of n correlated samples. To do so, the signal strength distribution is modeled as a Gaussian distribution having the probability distribution of Equation 7. Since the individual distribution of each samples follows a Gaussian distribution, the probability distribution of the average of n samples follows the Gaussian distribution whose mean is the mean of the distribution of each sample and whose variance is given by Equation 28. To calculate these values, only the values of n and a need be known. Typically, n is a value that is determined prior to the building of the radio map and $\alpha$ can be estimated from the one-sample lag autocorrelation coefficient $r_1$ as derived above. Radio map builder 100 in conjunction with correlation modeler 110 stores the model probability distribution function in the radio map database 120.

Figure 10:
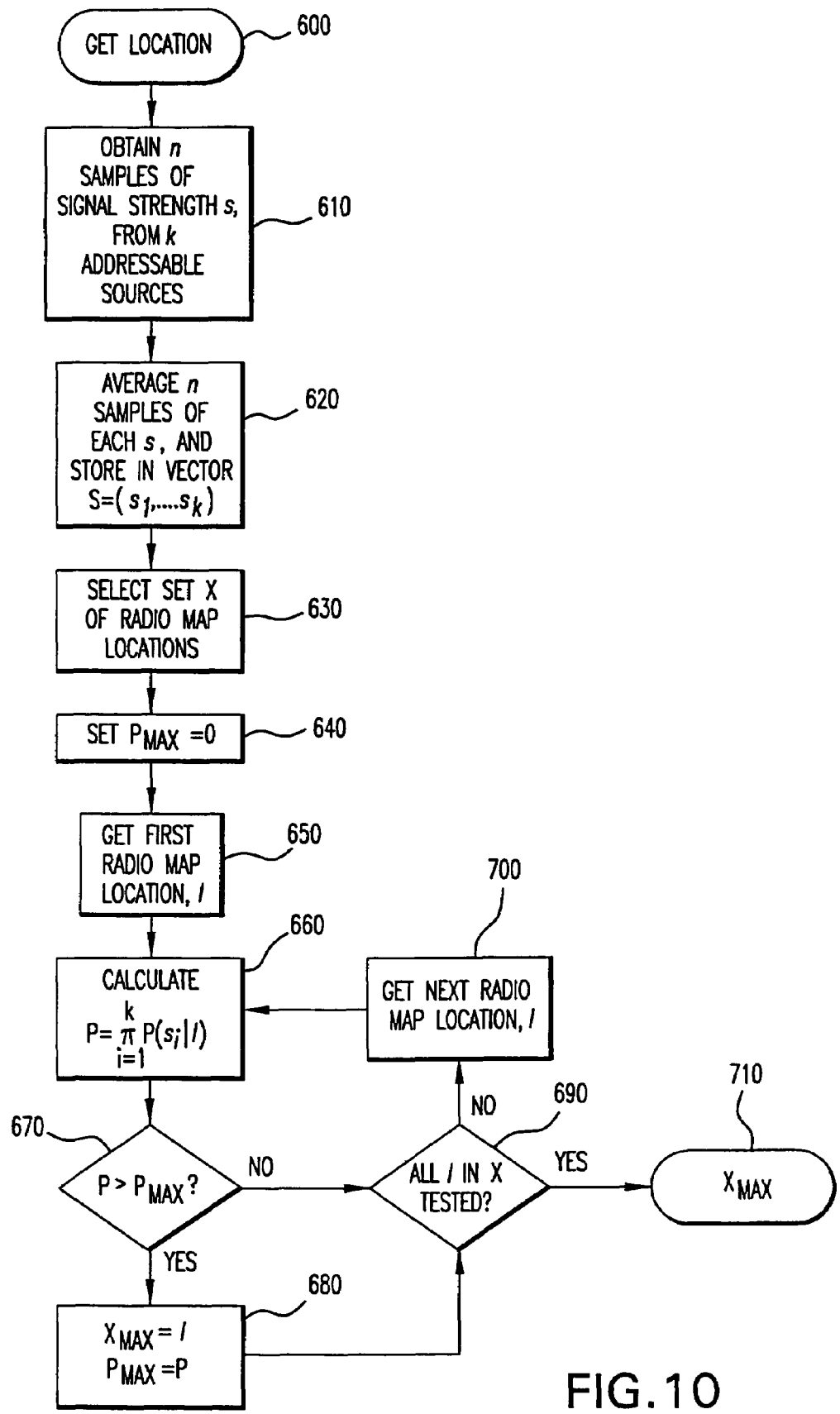
FIG. 10 is a flow chart illustrating the primary steps in the location determination algorithm of the present invention.

Referring to FIG. 10, the location determination phase is illustrated in a flow diagram. The algorithm collects n samples from each access point and obtains their average. The probability of each radio map location given this average value is calculated using the distribution of the average of n samples calculated by correlation modeler 110. Note that the value of a is implicitly used in the location determination phase as the distribution of the average of n samples depends on α, as shown above.

The location determination algorithm of FIG. 10 is entered through block 600. In block 610, n samples of the signal strength $s_i$ from k addressable sources is collected and, as shown in block 620, the average of the signal strength components is taken and stored in a vector $s=(s_1, \ldots s_k)$. A search space, X, which may be set or cluster of locations, is selected either prior to processing or via clustering module 170.

In block 640, a maximum probability variable $P_{MAX}$ is initialized to zero. Control is transferred to block 650 whereby the first radio map location l∈X is selected. This first location l may be established from a user's last known location. It is a feature of the present invention to manage a user profile in which known locations and/or most frequently visited locations of the user are stored. Obviously, a reasonable estimate of the first radio map location l from which to begin the searching process in determining the user's present location greatly reduces the amount of computation necessary.

In block 660 of FIG. 10, P(l|s) is calculated via Equation (6) above. It is then determined, as shown in block 670, whether this calculated probability is the maximum probability thus far in the processing. If not, control is transferred to decision block 690 where it is determined if all locations in the radio map have been tested. If the probability calculated in block 660 is a maximum value, the process sets the value l to be the current $x_{MAX}$ and sets the calculated probability P to be the new value of $P_{MAX}$. $x_{MAX}$ represents the current estimate of the location x that maximizes the probability P(x|s).

Each location l in the set X is tested, as shown in block 700, to determine if it is the location in the radio map that maximizes P(x|s). When all l have been tested, as determined in block 690, the values stored in $x_{MAX}$ will be the best estimate of the user's location given the measured signal strength from all access points at that location.

As previously stated, small-scale compensator 150 utilizes a perturbation technique to detect and to compensate for variations in the measured signal strength on a small spatial scale (on the order of a wavelength). The method of the present invention first calculates an estimated location using the discrete-space radio map. The system then calculates the distance between the estimated location and a previous user location. If this distance is above a predetermined threshold, the method of the present invention infers that small-scale variations are effecting the measured signal strength.

To compensate for these small-scale variations, small-scale compensator 150 perturbs the received vector entries and re-estimates the location. The nearest location to the previous user location is chosen as the final location estimate. As an example, for a received signal vector $s=(s_1, \ldots s_k)$, small-scale compensator 150 could perturb vector s to obtain the vector $s'=(s_1(1+e), \ldots s_k(1+e))$. where $e \in \{-d, 0, d\}$ is the percentage by which the signal strength is perturbed (0 for no perturbation).

Typically, measurements from three access points (k=3) are adequate to obtain a user's position with sufficient accuracy, so the number of perturbed vector components is limited. Moreover, experimentation has shown that the small-scale variations depend heavily on the magnitude of the signal strength received. Thus, perturbing the component corresponding to the strongest access point can obtain sufficient results. The value of d is chosen as an amount relative to the received signal strength.

To reduce the computational requirement of the location determination algorithm, the present invention implements clustering module 170 to limit the number of locations to be examined during the on-line phase. A cluster is defined as a set of locations sharing a common set of access points. This common set of access points is the cluster key. In the location determination phase, only those locations within the cluster need be evaluated in accordance with the location determination algorithm described above. Thus, given a location x the clustering problem is then to determine to which cluster x belongs.

In one embodiment of the present invention, clustering is achieved by grouping locations according to the access points providing that location with coverage. That is to say, two locations $x_1$ and $x_2$ are placed in the same cluster iff the set of access points covering these locations are identical. However, this approach for clustering has problems in that, as previously discussed, an access point may be missing from some of the samples and, therefore, using the entire set of access points that cover a location may fail to find the correct cluster due to the missing access point.

In an exemplary embodiment of the present invention, a subset of the set of access points which contains only q elements are used. The clustering problem then becomes, given a number q, to put all of the locations that share q access points in one cluster. In one embodiment of the present invention, q is chosen such that all locations are covered by at least q access points most of the time. This factor lessens the effect of variability in the number of access points with time. This suggests that the value of q should be less than or equal to the minimum number of access points covering any location in the radio map. Additionally, the value for q should ensure that locations are distributed evenly between the clusters to reduce the required computations.

If the number of access points covering a location is varying with time, it would be obvious to ask which access points should be chosen for a given location. Intuitively, one would choose the access points that appear most of the time in the samples. FIG. 5 suggests that the q access points with the largest signal strength values at each location should be chosen.

It has been shown from empirical data that, at some locations, the order of the access points with the largest signal strength values changes when the signal strength values from these access points are near to each other. Therefore, the q access points may be treated as a set as opposed to an ordered tuple. For example. if q=2 and the two access points with the largest and second largest signal strength value at location $x_1$ are $(AP_1, AP_2)$, respectively, and $(AP_2, AP_1)$, for another location $x_2$, location $x_1$ and location $x_2$ may be placed in the same cluster regardless of the order of the distance of the access point from the location.

In an exemplary embodiment of the present invention, the set of the q strongest access point covering a given location x is used to determine the cluster to which the location belongs. Then, only those locations in the radio map for which these q access points are the strongest will comprise the search space, X, of the location determination algorithm, as discussed above.

In another embodiment of the present invention, clustering is done incrementally during the online location determination phase. To do so, one must observe that each access point defines a subset of radio map locations covered thereby. These locations may be viewed as a cluster whose cluster key is the access point covering the locations. Starting with a first access point (e.g., the access point from which the strongest signal is obtained), the search space X may be restricted to only those locations covered thereby. A second access point is chosen which provides coverage to some or all of the locations in X which are also covered by the first access point. Additional access points are appended to the cluster key until search space X has been adequately reduced, at which time the cluster key is also obtained.

Although the invention has been described herein in conjunction with specific embodiments thereof, many alternatives, modifications and variations will be apparent to those skilled in the art. The present invention is intended to embrace all such alternatives, modifications, and variations that fall within the spirit and broad scope of the appended Claims.

What is claimed is:

1. A method for locating an addressable receiver of electromagnetic radiation relative to locations of a plurality of addressable sources of the electromagnetic radiation in a wireless communication network, the method comprising the steps of:

establishing a plurality of radio maps having coordinates corresponding to locations in space at which a calibration signal strength from each of a set of the plurality of addressable sources is measured, each of said radio maps having stored at said coordinates thereof a probability distribution of said calibration signal strength from a corresponding one of said set of said plurality of addressable sources;

measuring a received signal strength of each of said set of addressable sources at the addressable receiver;

compensating said received signal strength measurement of each of said set of addressable sources for temporal variations therein; and identifying one of said coordinates of said plurality of radio maps corresponding to a location in space at which said compensated signal strength measurement of said set of addressable sources would be measured with maximum probability given said probability distribution of calibration signal strength of said set of addressable sources thereat, said identified coordinate being a discrete-space estimate of the location of the addressable receiver.

2. The method for locating an addressable receiver as recited in claim 1, whereby said probability distribution is a histogram of said calibration signal strength at each of said plurality of coordinates.

3. The method for locating an addressable receiver as recited in claim 1, whereby said probability distribution is a continuous probability distribution modeled from said calibration signal strength measurements from each of the plurality of addressable sources at each of said plurality of coordinates.

4. The method for locating an addressable receiver as recited in claim 3, whereby said radio map establishing step includes the steps of:

averaging a predetermined averaging number of said calibration signal strength measurements for each of said plurality of coordinates;

calculating m autoregression coefficients, m being an integer value, for an autoregressive model of order m of said averaged calibration signal strength measurements for each of said set of addressable sources at each of said plurality of coordinates; and modeling said continuous probability distribution for each of said plurality of coordinates from said averaging number and said m autoregression coefficients.

5. The method for locating an addressable receiver as recited in claim 4, whereby said received signal strength measurement compensating step includes the step of averaging said predetermined averaging number of said received signal strength measurements for each of said set of addressable sources.

6. The method for locating an addressable receiver as recited in claim 4, whereby said modeled continuous probability distribution is interpolated via an interpolation function applied between a predetermined number of adjacent ones of said plurality of coordinates of said radio map to establish a continuous-space location estimate of the addressable receiver.

7. The method for locating an addressable receiver as recited in claim 6, whereby said interpolation function is a linear function of space between said adjacent ones of said plurality of coordinates of said radio map.

8. The method for locating an addressable receiver as recited in claim 4, whereby said order m of said autoregressive model is unity (m=1).

9. The method for locating an addressable receiver as recited in claim 8, whereby said modeled continuous probability distribution is Gaussian.

10. The method for locating an addressable receiver as recited in claim 9, whereby said autoregression coefficient is equated to a one-sample lag autocorrelation coefficient of said averaged calibration signal strength measurements.

11. The method for locating an addressable receiver as recited in claim 10, whereby said modeled Gaussian probability distribution has a mean value equal to a mean value of said calibration signal strength measurements and has a variance equal to a variance of said calibration signal strength measurements multiplied by a function of said averaging number and said one-sample lag autocorrelation coefficient.

12. The method for locating an addressable receiver as recited in claim 11, whereby said function of said averaging number and said one-sample lag autocorrelation coefficient is:

$$\frac{1}{n^2}\left\{\left(\frac{1-\alpha^n}{1-\alpha}\right)^2 + n - 1 - \alpha^2\frac{1-\alpha^{2(n-1)}}{1-\alpha^2}\right\},$$

where n is said averaging number and $\alpha$ is said one-sample lag autocorrelation coefficient.

13. The method for locating an addressable receiver as recited in claim 9, whereby said modeled Gaussian probability distribution of said calibration signal strength is interpolated via a continuously variable estimate of a mean value of said Gaussian probability function applied between a predetermined number of adjacent ones of said plurality of coordinates of said radio map to establish a continuous-space location estimate of the addressable receiver.

14. The method for locating an addressable receiver as recited in claim 13, whereby predetermined number of adjacent ones of said plurality of coordinates is three, said three coordinates forming vertices of a triangle, said continuous-space location estimate of the addressable receiver being located in said triangle corresponding to a location in space at which said compensated signal strength measurement of said set of addressable sources would be measured with maximum probability given said probability distribution of calibration signal strength of said set of addressable sources thereat.

15. The method for locating an addressable receiver as recited in claim 1 further including the steps of:
- comparing said discrete-space location estimate to a previously identified discrete-space location estimate;
- adding a perturbation value to said received signal strength measurements of each of said addressable sources if said previously calculated discrete-space location estimate is separated from said discrete-space location estimate by greater than a predetermined value;
- compensating said perturbed received signal strength measurements for temporal variations therein; and
- repeating the method at said coordinate identifying step using said compensated perturbed received signal strength measurements as said compensated signal strength measurement of each of said addressable source.

16. The method for locating an addressable receiver as recited in claim 1, whereby said coordinate identifying step further includes the steps of:
- selecting a predetermined clustering number of said set of addressable sources from which said predetermined clustering number of greatest average received signal strengths are measured as a cluster key;
- forming a cluster of said coordinates of said radio map corresponding to each of said set of addressable sources at which a calibration signal measurement taken thereat is among said predetermined clustering number of greatest calibration signal measurements in each radio map corresponding to a respective one of said addressable sources in said cluster key; and
- evaluating only said coordinates of said cluster to identify said one of said coordinates.

17. The method for locating an addressable receiver as recited in claim 1, whereby said coordinate identifying step further includes the steps of:
- selecting one of said set of addressable sources from which a greatest average received signal strength is measured as a first addressable source of a cluster key;
- forming a cluster of said coordinates of said radio map corresponding to said first addressable source of said cluster key;
- appending to said cluster key one of said set of addressable sources from which a next greatest average received signal strength is measured;
- deleting from said cluster all of said coordinates therein for which said calibration signal measurement is less than said calibration signal measurements of said addressable sources in said appended cluster key;
- repeating the method at said cluster key appending step until said cluster contains only a predetermined number of coordinates; and
- evaluating only said coordinates of said cluster to identify said one of said coordinates.

18. A method for locating an addressable source of electromagnetic radiation relative to locations of a plurality of addressable receivers of the electromagnetic radiation in a wireless communication network, the method comprising the steps of:
- establishing a plurality of radio maps having coordinates corresponding to locations in space at which a calibration signal strength from the addressable source is measured at each of a set of the plurality of addressable receivers, each of said radio maps having stored at said coordinates thereof a probability distribution of said calibration signal strength measured at a corresponding one of said set of said plurality of addressable receivers;
- measuring a received signal strength of the addressable source at each of said set of addressable receivers;
- compensating said received signal strength measurement of the addressable source at each of said set of addressable receivers for temporal variations therein; and
- identifying one of said coordinates of said plurality of radio maps corresponding to a location in space at which said compensated signal strength of the addressable source would be measured at said set of addressable receivers with maximum probability given said probability distribution of calibration signal strength of said addressable source at said set of addressable receivers, said identified coordinate being a discrete-space estimate of the location of the addressable source.

19. The method for locating an addressable source as recited in claim 18, whereby said probability distribution is a histogram of said calibration signal strength at each of said plurality of coordinates.

20. The method for locating an addressable source as recited in claim 18, whereby said probability distribution is a continuous probability distribution modeled from said calibration signal strength measurements from the addressable source at each of said set of addressable receivers for each of said plurality of coordinates.

21. The method for locating an addressable source as recited in claim 20, whereby said radio map establishing step includes the steps of:
- averaging a predetermined averaging number of said calibration signal strength measurements for each of said plurality of coordinates;
- calculating m autoregression coefficients, m being an integer value, for an autoregressive model of order m of said averaged calibration signal strength measurements for the addressable source at each of said plurality of coordinates; and
- modeling said continuous probability distribution for each of said plurality of coordinates from said averaging number and said m autoregression coefficients.

22. The method for locating an addressable source as recited in claim 21, whereby said received signal strength measurement compensating step includes the step of averaging said predetermined averaging number of said received signal strength measurements from the addressable source at each of said set of addressable receivers.

23. The method for locating an addressable source as recited in claim 21, whereby said modeled continuous probability distribution is interpolated via an interpolation function applied between a predetermined number of adjacent ones of said plurality of coordinates of said radio map to establish a continuous-space location estimate of the addressable source.

24. The method for locating an addressable source as recited in claim 23, whereby said interpolation function is a linear function of space between said adjacent ones of said plurality of coordinates of said radio map.

25. The method for locating an addressable source as recited in claim 21, whereby said order m of said autoregressive model is unity (m=1).

26. The method for locating an addressable source as recited in claim 25, whereby said modeled continuous probability distribution is Gaussian.

27. The method for locating an addressable source as recited in claim 26, whereby said autoregression coefficient is equated to a one-sample lag autocorrelation coefficient of said averaged calibration signal strength measurements.

28. The method for locating an addressable source as recited in claim 27, whereby said modeled Gaussian probability distribution has a mean value equal to a mean value of said calibration signal strength measurements and has a variance equal to a variance of said calibration signal strength measurements multiplied by a function of said averaging number and said one-sample lag autocorrelation coefficient.

29. The method for locating an addressable source as recited in claim 28, whereby said function of said averaging number and said one-sample lag autocorrelation coefficient is:

$$\frac{1}{n^2}\left\{\left(\frac{1-\alpha^n}{1-\alpha}\right)^2 + n - 1 - \alpha^2 \frac{1-\alpha^{2(n-1)}}{1-\alpha^2}\right\},$$

where n is said averaging number and $\alpha$ is said one-sample lag autocorrelation coefficient.

30. The method for locating an addressable source as recited in claim 26, whereby said modeled Gaussian probability distribution of said calibration signal strength is interpolated via a continuously variable estimate of a mean value of said Gaussian probability function applied between a predetermined number of adjacent ones of said plurality of coordinates of said radio map to establish a continuous-space location estimate of the addressable source.

31. The method for locating an addressable source as recited in claim 30, whereby predetermined number of adjacent ones of said plurality of coordinates is three, said three coordinates forming vertices of a triangle, said continuous-space location estimate of the addressable source being located in said triangle corresponding to a location in space at which said compensated signal strength measurement of the addressable source would be measured at said set of addressable receivers with maximum probability given said probability distribution of calibration signal strength of the addressable source at said set of addressable receivers.

32. The method for locating an addressable source as recited in claim 18 further including the steps of:
  comparing said discrete-space location estimate to a previously identified discrete-space location estimate;
  adding a perturbation value to said received signal strength measurements of the addressable source if said previously calculated discrete-space location estimate is separated from said discrete-space location estimate by greater than a predetermined value;
  compensating said perturbed received signal strength measurements for temporal variations therein; and
  repeating the method at said coordinate identifying step using said compensated perturbed received signal strength measurements as said compensated signal strength measurement of the addressable source.

33. The method for locating an addressable source as recited in claim 18, whereby said coordinate identifying step further includes the steps of:
  selecting a predetermined clustering number of said set of addressable receivers from which said predetermined clustering number of greatest average received signal strengths are measured as a cluster key;
  forming a cluster of said coordinates of said radio map corresponding to each of said set of addressable receivers at which a calibration signal measurement taken thereat is among said predetermined clustering number of greatest calibration signal measurements in each radio map corresponding to a respective one of said addressable receivers in said cluster key; and
  evaluating only said coordinates of said cluster to identify said one of said coordinates.

34. The method for locating an addressable source as recited in claim 18, whereby said coordinate identifying step further includes the steps of:
  selecting one of said set of addressable receivers at which a greatest average received signal strength is measured as a first addressable receiver of a cluster key;
  forming a cluster of said coordinates of said radio map corresponding to said first addressable receiver in said cluster key;
  appending to said cluster key one of said set of addressable receivers at which a next greatest average received signal strength is measured;
  deleting from said cluster all of said coordinates therein for which said calibration signal measurement is less than said calibration signal measurements of said addressable receivers in said appended cluster key;
  repeating the method at said cluster key appending step until said cluster contains only a predetermined number of coordinates; and
  evaluating only said coordinates of said cluster to identify said one of said coordinates.

35. A system for locating a user in a wireless communication network comprising:
  a computing device having a wireless network interface card installed therein, said wireless network interface card adapted to the wireless communication network;
  a plurality of access points for communicating signals between said wireless network interface card and the wireless communication network;
  a radio map builder for establishing a plurality of radio maps having coordinates corresponding to locations in space at which a calibration signal strength as measured between each of a set of said plurality of access points and said wireless network interface card, each of said radio maps having stored at said coordinates thereof a probability distribution of said calibration signal strength for each of said plurality of access points;
  a radio map database for storing said plurality of radio maps therein;
  a correlation modeler for performing time-series analysis on said calibration signal measurement and compensating said calibration signal measurement for temporal variations therein;
  a correlation handler for compensating a location determination signal between said wireless network interface card and each of said access points; and
  a discrete-space estimator for providing a discrete-space estimate of the user location by identifying one of said coordinates of said plurality of radio maps corresponding to a location in space at which said compensated location determination signal would be measured with maximum probability given said probability distribution of calibration signal strength measurements between said wireless network interface card and said plurality of access points stored in said corresponding radio maps.

36. The system for locating a user in a wireless communication network as recited in claim 35 further comprising:
  a clustering module for selecting as a cluster key a predetermined clustering number of access points at which said predetermined clustering number of greatest signal strengths between said wireless network interface card and said access point was measured and for grouping together into a cluster coordinates of said radio maps corresponding to each of said set of access points at which said calibration signal measurement is among said predetermined clustering number of greatest calibration signal measurements in each radio map corresponding to a respective one of said access points in said cluster key; and a clustering database for storing a plurality of clusters and corresponding cluster keys therein.

37. The system for locating a user in a wireless communication network as recited in claim 35 further comprising a small-scale compensator for adjusting said location determination signal for spatial variations therein when a previously calculated discrete-space estimate is spatially removed from said discrete-space estimate by greater than a predetermined threshold.

38. The system for locating a user in a wireless communication network as recited in claim 35 further comprising a continuous-space estimator for applying an interpolation function between a predetermined number of adjacent ones of said plurality of coordinates of said radio map to establish a continuous-space estimate of the user location.

39. The system for locating a user in a wireless communication network as recited in claim 35, wherein said plurality of access points and said wireless network interface card are compliant with Institute of Electrical and Electronics Engineers' 802.11 standard.

* * * * *